US006518980B1

(12) United States Patent (10) Patent No.: US 6,518,980 B1
DeMotte et al. (45) Date of Patent: Feb. 11, 2003

(54) METHOD AND SYSTEM FOR ALLOWING A PROGRAMMABLE CONTROLLER TO COMMUNICATE WITH A REMOTE COMPUTER

(75) Inventors: Donald D. DeMotte, Lake Orion, MI (US); Jim Huber, Rochester Hills, MI (US)

(73) Assignee: Fanuc Robotics North America, Inc., Rochester Hills, MI (US)

( * ) Notice: Subject to any disclaimer, the term of this patent is extended or adjusted under 35 U.S.C. 154(b) by 0 days.

(21) Appl. No.: 09/443,789

(22) Filed: Nov. 19, 1999

(51) Int. Cl.[7] .................................................. G06F 13/00
(52) U.S. Cl. .......................................... 345/762; 709/9
(58) Field of Search ................................. 345/762, 765, 345/744, 804; 709/9, 96, 17, 18

(56) References Cited

U.S. PATENT DOCUMENTS

| 5,103,403 | A | 4/1992 | Ch'Hayder et al. |
| 5,373,221 | A | 12/1994 | McGee et al. |
| 5,705,906 | A | 1/1998 | Tanabe et al. |
| 5,706,502 | A | 1/1998 | Foley et al. |
| 5,742,762 | A | 4/1998 | Scholl et al. |
| 5,805,442 | A | 9/1998 | Crater et al. |
| 5,857,206 | A | 1/1999 | Tsutsumitake |
| 5,862,330 | A | 1/1999 | Anupam et al. |
| 5,878,218 | A | 3/1999 | Maddalozzo, Jr. et al. |
| 6,151,625 | A | 11/2000 | Swales et al. |
| 6,175,206 | B1 | 1/2001 | Ueno et al. |
| 6,201,996 | B1 * | 3/2001 | Crater et al. ................. 700/9 |
| 6,208,948 | B1 | 3/2001 | Klinger et al. |

FOREIGN PATENT DOCUMENTS

| DE | 29823119 | 4/1999 |
| EP | 0838768 | 4/1998 |
| EP | 0992867 | 4/2000 |

OTHER PUBLICATIONS

Notification of Transmittal Of The International Search Report or the Declaration; International Application No. PCT/US 00/31350; International filing date Nov. 15, 2000.
PCT International Search Report—International Application No. PCT/US 00/31350; International Filing Date Nov. 15, 2000.
Functionality Overview of an Open Source Embedded Web Server by GoAhead Software, Inc. May 1999.

* cited by examiner

*Primary Examiner*—Cao H. Nguyen
(74) *Attorney, Agent, or Firm*—Howard & Howard

(57) ABSTRACT

A method and system for allowing a remote computer to communicate with a programmable controller having a memory for storing a plurality of types of data objects includes an interface module at the controller for receiving a request from the remote computer for one of the data objects stored in the programmable controller. A data converter module determines the type of the data object being requested and automatically converts the data into a comprehensible format based on the type of the data object. The interface module then generates a user display in response to the request for transmission to the remote computer. The remote computer includes a display for displaying the user display so as to allow a user to access the comprehensible format of the requested data.

35 Claims, 4 Drawing Sheets

Fig-3

METHOD AND SYSTEM FOR ALLOWING A PROGRAMMABLE CONTROLLER TO COMMUNICATE WITH A REMOTE COMPUTER

TECHNICAL FIELD

This invention relates to methods and systems for allowing a programmable controller to communicate with a remote computer.

BACKGROUND OF THE INVENTION

Programmable controllers operate elaborate industrial equipment, such as robots, in accordance with a plurality of stored control programs. When executed, each program causes the controller to examine the state of the controlled machinery by evaluating signals from one or more sensing devices (e.g., position encoders, temperature sensors, or pressure sensors) and to operate the machinery (e.g., by controlling the output voltage for servo motors, or energizing/de-energizing discrete components) based on a procedural framework, the sensor signals and, if necessary, more complex processing.

The programmable controller is generally described as a computer-based control unit that is represented by an aggregate of conventional elements, including a central processing unit, a crystal controlled clock, random access memory, communication channels, digital and analog input/output ports and D/A and A/D converter channels. The control unit also supports a user interface, which may include a teach pendant and/or video display terminal, to facilitate operator input of processing programs, commanded positions, and system parameters.

One known method and system to overcome this problem is disclosed in U.S. Pat. No. 5,805,442 to Crater et al, entitled "Distributed Interface Architecture For Programmable Industrial Control Systems." Crater et al. shifts the burden of providing user interfaces for changing forms of data from the remote computer to the controllers. This is accomplished by combining data with functionality for displaying that data at the individual controllers. Each of the controllers has a computer memory for storing the relevant data and formatting instructions, i.e., web pages, associated with the data that allow a properly equipped remote computer to display the data in a predetermined format. Thus, each type of data has a web page associated with it stored in the controller's memory. However, this adds complexity and increased memory capacity to the programmable controller.

Thus, there exists a need for enhancing communication between a programmable controller and a remote computer while still allowing the remote computer to access different types of data.

SUMMARY OF THE INVENTION

It is an object of the present invention to provide an efficient and simple method for enabling communication between a programmable controller and a remote computer having varying types of data objects stored therein.

In carrying out the above object, a method for allowing a programmable controller to communicate with a remote computer is provided. The method includes receiving a request from the remote computer for one of the data objects stored in the programmable controller, determining the type of the data object being requested and automatically converting the data into a comprehensible format based on the type of the data object, generating a user display in response to the request for transmission to the remote computer, and utilizing the user display at the remote computer to allow a user to access the comprehensible format of the requested data.

Still further, in carrying out the above object, a system is provided for performing the steps associated with the method of the present invention. The system includes an interface module at the controller for receiving a request from the remote computer for one of the data objects stored in the programmable controller and a data converter module for determining the type of the data object being requested and automatically converting the data into a comprehensible format based on the type of the data object. The interface module generates the user display in response to the request for transmission to the remote computer. The remote computer includes a display for displaying the user display to allow a user to access the comprehensible format of the requested data.

These and other features of the present invention can be understood from the following specification and drawings.

BRIEF DESCRIPTION OF THE DRAWINGS

FIG. 3 is an example of a formatted user display generated by the programmable controller of the present invention.

DETAILED DESCRIPTION OF A PREFERRED EMBODIMENT

Figure 1:
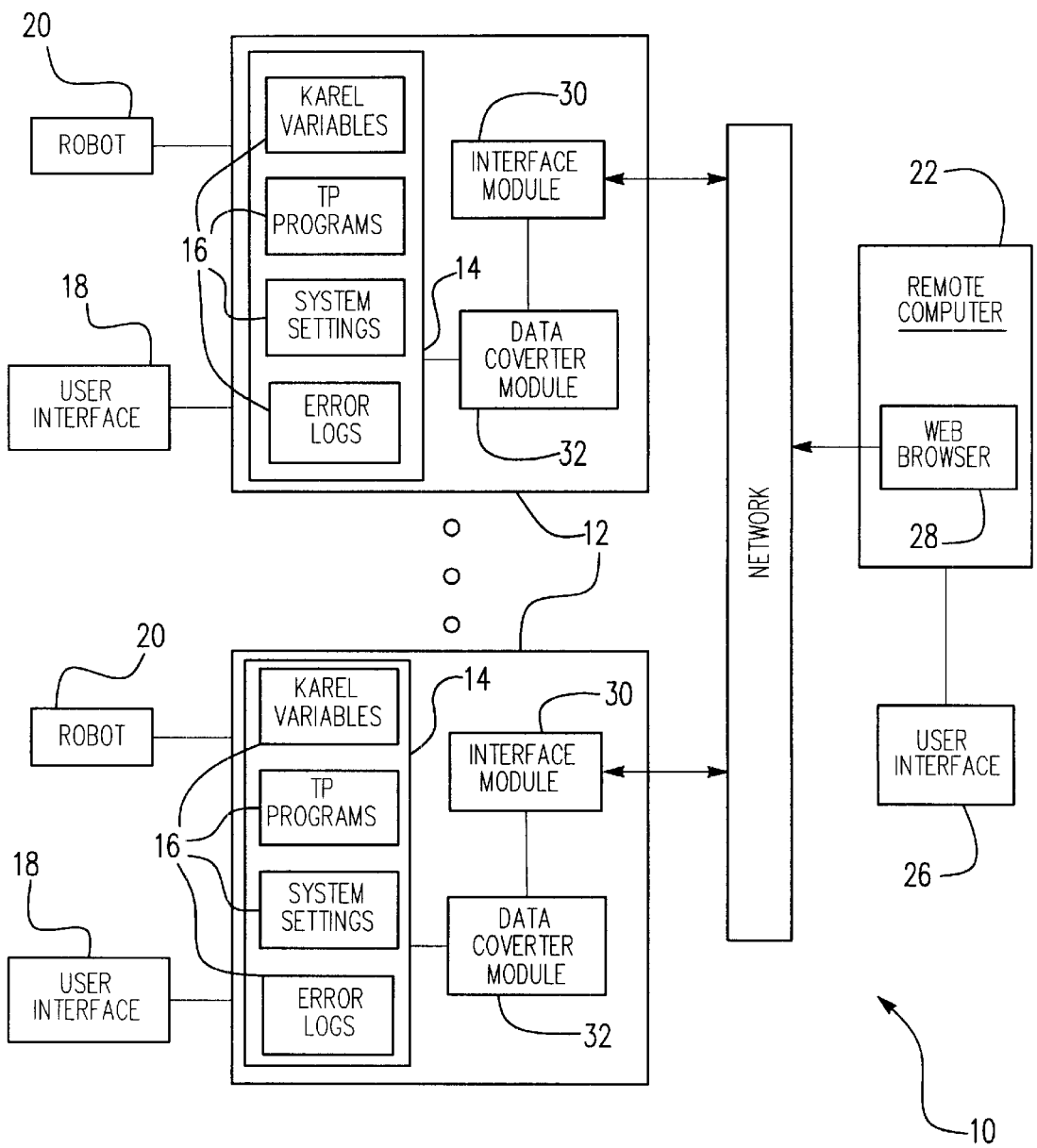
FIG. 1 is a schematic view of a system incorporating the present invention.

FIG. 1 shows a system 10 incorporating the present invention. The system 10 includes at least one programmable controller 12 having a memory 14 for storing a plurality of types of data objects 16. The memory 14 may be a CMOS (Complementary Metal Oxide Semiconductor), a DRAM (Dynamic Random Access Memory), a FROM (Flash Read Only Memory), or any other suitable memory or combination thereof. The types of data objects 16 include, but are not limited to, system variables, user program variables, user TP programs, error logs, system settings, 10 configuration and current states, and KAREL variables, where KAREL is a programming language that is a practical blend of logical, English-like features of high level languages, such as Pascal and PL/1, and the proven factory-floor effectiveness of machine control languages. These types of data objects 16 are written in different formats as well as in different programming languages. For example, the format is different for the error logs, the system variables and the user TP programs. The KAREL variables are written in a language different from the TP user programs as well as stored in different formats. Thus, therein lies the difficulty in easily accessing and reading the data stored in the controller 12.

The programmable controller 12 may include a user interface 18 for allowing a user to enter data or programs into the controller 12 or for accessing the data stored therein. The user interface 18 may include a display, such as a teach pendant, for displaying the information to the user.

The programmable controller 12 may be a robot controller, wherein in such a case, the controller 12 is coupled to a robot 20 for actively performing a variety of tasks. However, the present invention is not limited to robot controllers. The programmable controller 12 may be a passive controller, such as a monitoring device that monitors predetermined conditions.

To assist in monitoring operation of the programmable controller 12, at least one remote computer 22 is coupled to the programmable controller 12 preferably via a functional network 24. The remote computer 22 may be located in the same room or building as the programmable controller 12, or it may be located in an entirely different building, which may or may not be located in the same geographic vicinity as the controller 12. The network 24 may be a local area network of controllers communicating via, for example, the Ethernet protocol, or a direct link to the Internet.

Coupled to the remote computer 22 is a second user interface 26, such as a keyboard, mouse, and/or display, for entering information regarding the desired data to be accessed. Remote computer 22 also includes a network facilitator 28, in communication with the user interface 26 and the network 24, for facilitating data interchange with the programmable controller 12. Network facilitator may be any conventional web browser for locating, fetching and displaying requested information, wherein displaying can range from simple pictorial and textual rendering to real-time playing of audio and/or video segments or alarms, mechanical indications, printing, or storage of data for subsequent retrieval and display.

The programmable controller 12 includes an interface module 30 coupled to the network 24 for receiving requests for data from the remote computer 22. Interface module 30 is then coupled to a data converter module 32, which is in communication with memory 14, for processing the request. Data converter module 32 determines the object type of the data being requested and converts it accordingly into a comprehensible format. The data is typically stored in some form of binary format and the data converter module 32 converts it into a comprehensible format that is readable by the user of the remote computer 22 such as, text, graphics, audio, or tabular format.

Upon conversion of the data, interface module 30 dynamically generates a user display for transmission to the remote computer 22 via the network 24. The user display is then displayed to the user at the remote computer user interface 26 so that the user can read the data. In generating the user display, the interface module 30 generates instructions on how to display the requested data and then combines these newly created instructions with the comprehensible format of the data. These include instructions for displaying the text either textually and/or graphically or any other format or combination of formats. Preferably, the instructions are HTML (Hypertext Markup Language) codes that are added to the converted data at the time of the request for data.

Figure 2:
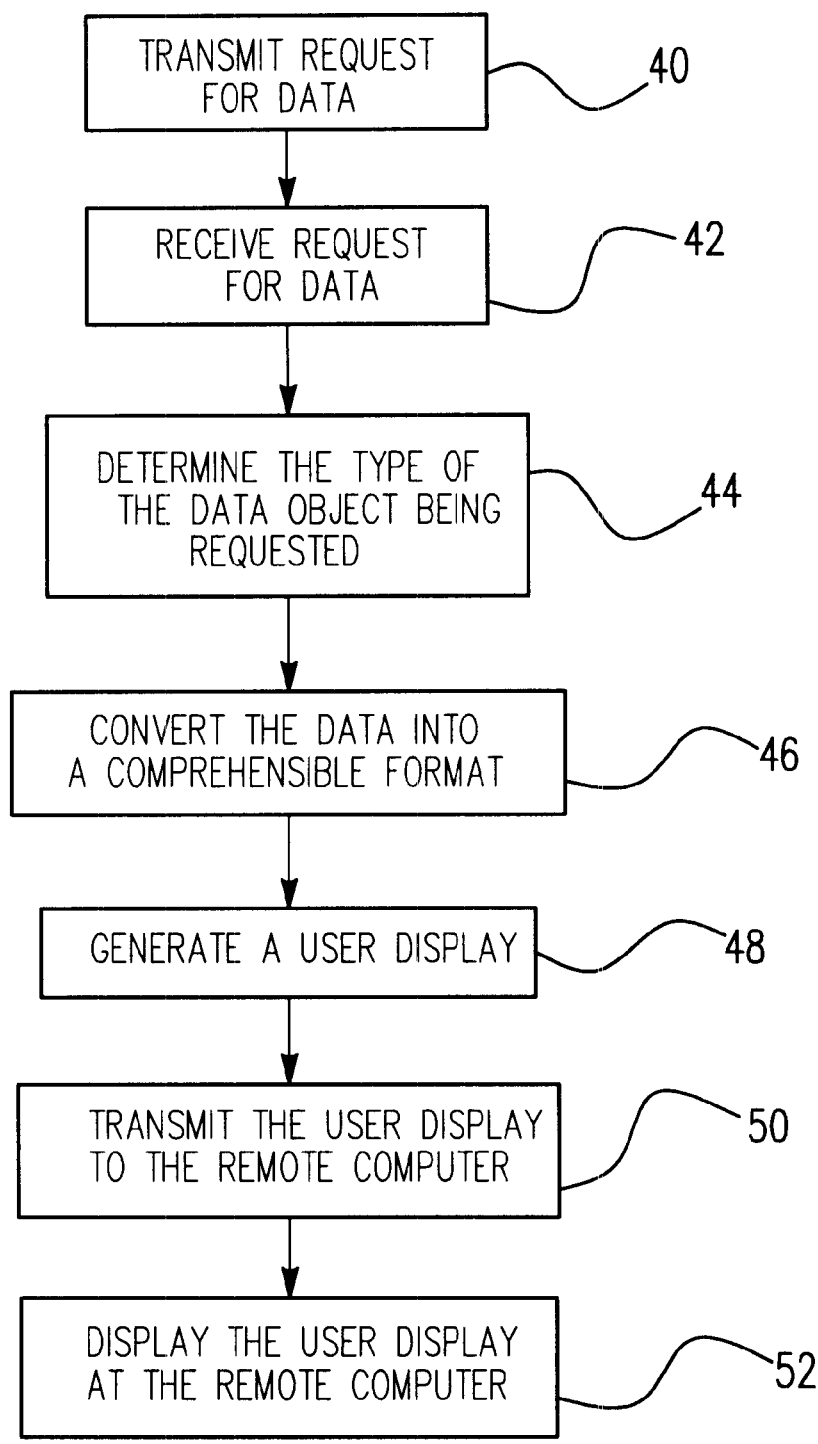
FIG. 2 is a flow chart illustrating the general sequence of steps associated with the method of the present invention.

FIG. 2 is a flow diagram illustrating the general steps associated with the operation of the present invention. At block 40, the user transmits a request for data from the remote computer to initiate operation of the interface module 30. Interface module 30 is initiated remotely by a logical connection from the web browser 28 to the interface module 30 utilizing a standard protocol. In order to insure proper routing of messages between the remote computer 22 and the controller 12, the messages are first broken up into data packets, each of which receives a destination address according to a consistent protocol, and which are reassembled upon receipt by interface module 30. A commonly accepted set of protocols for this purpose are the Internet Protocol, or IP, which dictates routing information and the transmission control protocol, or TCP, according to which messages are actually broken up into IP packets for transmission for subsequent collection and reassembly. TCP/IP connections are quite commonly employed to move data across telephone lines.

The Internet supports a large variety of information-transfer protocols, including the World Wide Web, or web. Web-accessible information is identified by a uniform resource locator or "URL," which specifies the location of the file in terms of a specific computer. Typically, a URL has the format "http://<host>/<path>", where "http" refers to the HyperText Transfer Protocol, "host" is the server's Internet identifier, and the "path" specifies the location of the file within the server. In the present invention, the general URL syntax to access various files on the programmable controller 12 may is preferably in the form of "http://<robot>[/device]/<filename>, where "robot" is the name or IP address of the robot controller 12, "device" is optional reference to physical devices on the controller 12, and "filename" is the actual file to retrieve. Thus, when the interface module 30 recognizes a URL directed to its corresponding controller 12, the message/request is accepted, as shown at block 42.

The data converter module 32 then determines the object type of the data being requested and converts the data accordingly into a comprehensible format, as shown at blocks 44 and 46, respectively. The data converter module 32 locates the requested data in memory and determines the type of the data object so that it knows how to access the data. Then, a conversion is performed from the original format of the data into a comprehensible format.

Figure 3:
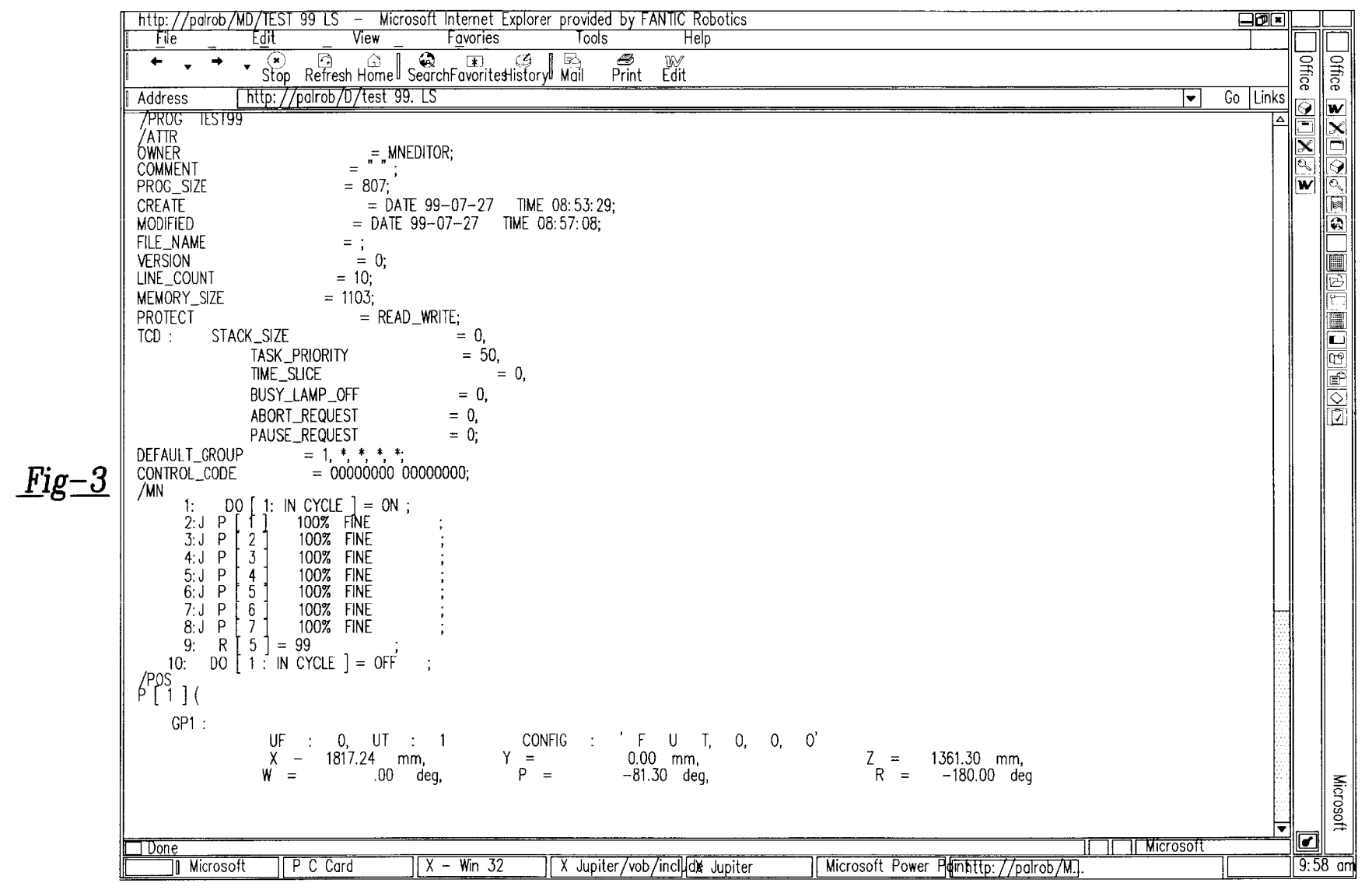

Next, interface module 30 creates the instructions on how to display the converted data and combines these instructions with the data itself to create a user display, as shown at block 48. This user display may be in the form of a web page, as shown in FIG. 3, in which case the instructions are created utilizing HyperText Markup Language (HTML) codes. HTML breaks the document into syntactic portions, such as headings, paragraphs, lists, etc., that specify layout and contents. An HTML file can contain elements such as text, graphics, tables and buttons, each identified by a "tag".

Figure 4:
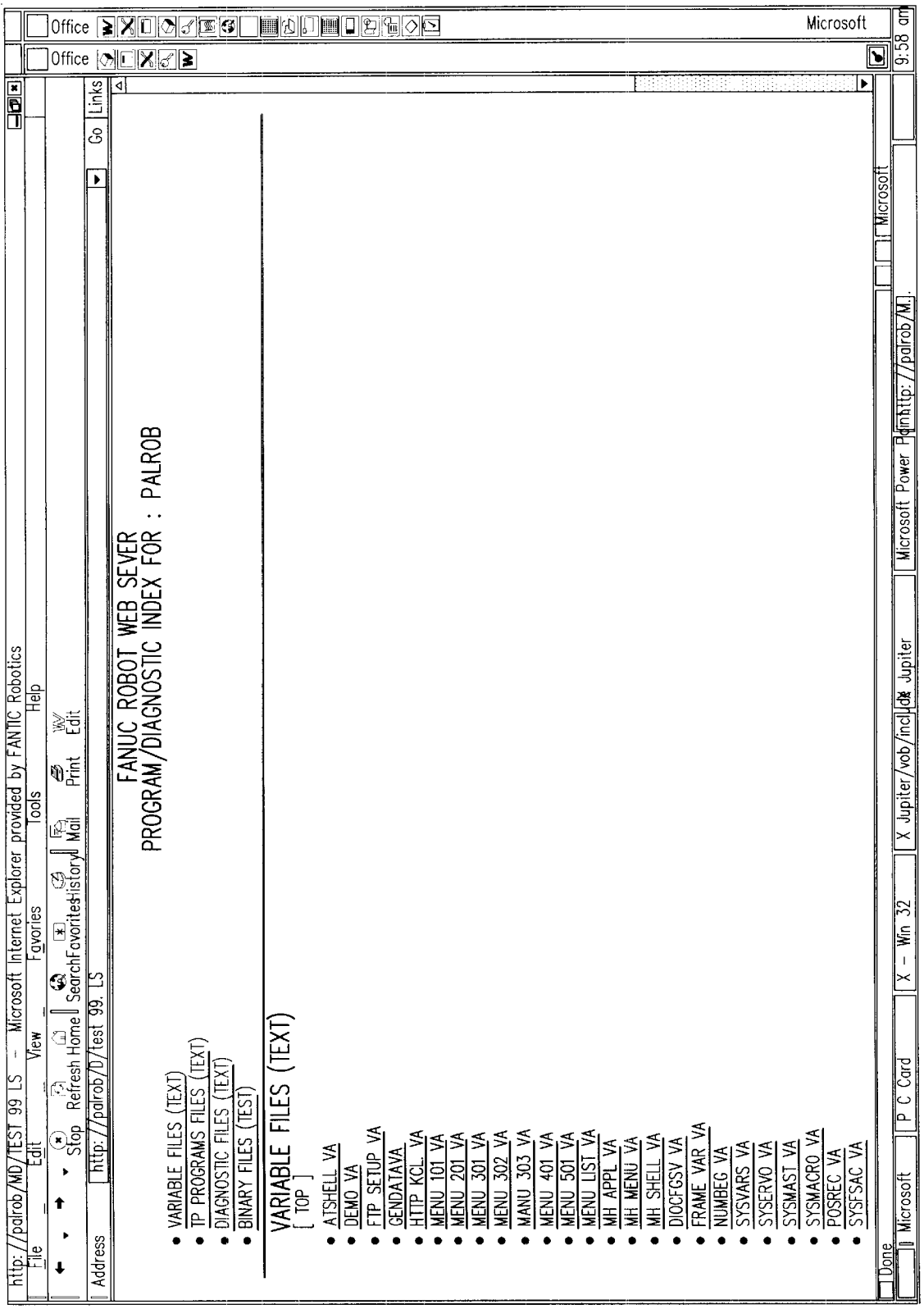
FIG. 4 is an example of a user display illustrating different possible data objects associated with a particular file.

As can be seen in FIG. 4, the requested data may have sub-data related thereto. For example, if the user requested a list of programs or data objects resident on the programmable controller 12, then the interface module 30 generates a user display containing the list of the data object types and a link to each data object. Thus, the user can then select a specific data object to display.

The user display is transmitted to the remote computer, block 50, for receipt by network facilitator, or web browser, 28. The web browser 28 then locates, fetches and displays resources, executes hyperlinks and applets, and generally interprets web page information in order to display the user display to the user, as shown at block 52. Web browser 28 may be any of the numerous available web browsers, e.g., NETSCAPE NAVIGATOR (supplied by Netscape Communications Corp.) or MOSAIC (different versions of which are available free of charge at a variety of web sites).

Thus, real-time data resident on the controller 12 is readily available to a user. And, an inexperienced user may access the controller 12 utilizing existing web products to obtain basic information contained in the controller 12. For example, a maintenance engineer can answer a troubleshooting call by accessing the controller 12 and looking at the error log from his desk. Or a production foreman may access a custom screen and determine the production counts for the day.

Preferred embodiments have been disclosed. However, a worker skilled in this art would recognize that modifications would come within the scope of this invention. Thus, the following claims should be studied to determine the scope and content of this invention.

What is claimed is:

1. A method for allowing a remote computer to communicate with a programmable controller having a memory for storing a plurality of types of data objects, the programmable controller being adapted to control a robot, the data objects describing the operation of the programmable controller and the robot the method comprising:

receiving a request from the remote computer for one of the data objects stored in the programmable controller;

determining the type of the data object being requested;

generating display instructions on how to display the requested data as a function of the type of the data object;

dynamically generating a web page in response to and after receiving the request for transmission to the remote computer as a function of the requested data and the display instructions;

delivering the web page to the remote computer; and, displaying the web page at the remote computer.

2. The method as recited in claim 1 wherein generating the instructions includes generating instructions on how to display the requested data textually.

3. The method as recited in claim 1 wherein generating the instructions includes generating instructions on how to display the requested data graphically.

4. The method as recited in claim 1 wherein generating the instructions includes generating instructions on how to display the requested data in a tabular manner.

5. The method as recited in claim 1 wherein generating the instructions includes generating instructions on how to generate an audible representation of the requested data.

6. The method as recited in claim 1 wherein receiving the request includes receiving a request for a list of the plurality of data objects and wherein generating the web page includes generating the web page containing the list of the plurality of data objects and wherein the web page allows the user to select one of the data objects.

7. The method as recited in claim 6 wherein the programmable controller is coupled to the remote computer via the Internet and wherein generating the instructions includes generating Hyper-Text Markup Language codes.

8. The method as recited in claim 1 wherein the step of dynamically generating a web page includes the step of converting the data into a comprehensible format.

9. A controller, as set forth in claim 1, wherein the types of data objects may include at least one of the following: error logs, system setting, user program variables, user programs, IO states, and variables that show the current state of operation of the programmable controller.

10. A system for allowing a remote computer to communicate with a programmable controller having a memory for storing a plurality of types of data objects, the programmable controller being adapted to control a robot, the data objects describing the operation of the programmable controller and the robot, the system comprising:

an interface module for receiving a request from the remote computer for one of the data objects stored in the programmable controller;

a data converter module for determining the type of the data object being requested and for generating display instructions on how to display the requested data as a function of the type of the data object;

the interface module for dynamically generating a web page in response to and after receiving the request for transmission to the remote computer as a function of the requested data and the display instructions and for delivering the web page to the remote computer; and a display for displaying the web page to allow a user to access the requested data.

11. The system as recited in claim 10 wherein the interface module, in generating the instructions, is further operative to generate instructions on how to display the requested data textually.

12. The system as recited in claim 10 wherein the interface module, in generating the instructions, is further operative to generate instructions on how to display the requested data graphically.

13. The system as recited in claim 10 wherein the interface module, in generating the instructions, is further operative to generate instructions on how to display the requested data in a tabular manner.

14. The system as recited in claim 10 wherein the interface module, in generating the instructions, is further operative to generate instructions on how to generate an audible representation of the requested data.

15. The system as recited in claim 10 wherein the interface module, in receiving the request, is further operative to receive a request for a list of the plurality of data objects and wherein the interface module, in generating the web page, is further operative to generate the web page containing the list of the plurality of data objects and wherein the display is further operative to display the web page so as to allow the user to select one of the data objects.

16. The system as recited in claim 15 wherein the programmable controller is coupled to the remote computer via a functional network and wherein the remote computer further includes a network facilitator for receiving the web page from the interface module.

17. The system as recited in claim 16 wherein the functional network is the Internet and wherein the interface module, in generating the instructions, is further operative to generate Hyper-Text Markup Language codes.

18. The system as recited in claim 17 wherein the network facilitator is a web browser.

19. The system as recited in claim 10 wherein the programmable controller is located at a first location and wherein the remote computer is located at a second location.

20. The system as recited in claim 19 wherein the first location is different from the second location.

21. The system as recited in claim 10 wherein the data converter module further converts the data into a comprehensible format.

22. A controller, as set forth in claim 10, wherein the types of data objects may include at least one of the following: error logs, system setting, user program variables, user programs, IO states, and variables that show the current state of operation of the programmable controller.

23. A programmable controller capable of communicating with a remote computer having a display, the controller having a memory for storing a plurality of types of data objects, the programmable controller being adapted to control a robot, the data objects describing the operation of the programmable controller and the robot, and further comprising:

an interface module for receiving a request from the remote computer for one of the data objects stored in the programmable controller;

a data converter module for determining the type of the data object being requested and for generating display instructions on how to display the requested data as a function of the type of the data object; and the interface module for generating a web page in response to and after receiving the request for transmission to the remote computer as a function of the requested data and the display instructions.

24. The controller as recited in claim 23 wherein the interface module, in generating the instructions, is further operative to generate instructions on how to display the requested data textually.

25. The controller as recited in claim 23 wherein the interface module, in generating the instructions, is further operative to generate instructions on how to display the requested data graphically.

26. The controller as recited in claim 23 wherein the interface module, in generating the instructions, is further operative to generate instructions on how to display the requested data in a tabular manner.

27. The controller as recited in claim 23 wherein the interface module, in generating the instructions, is further operative to generate instructions on how to generate an audible representation of the requested data.

28. The controller as recited in claim 23 wherein the interface module, in receiving the request, is further operative to receive a request for a list of the plurality of data objects and wherein the interface module, in generating the web page, is further operative to generate the web page containing the list of the plurality of data objects.

29. The controller as recited in claim 23 wherein the programmable controller is coupled to the remote computer via a functional network and wherein the remote computer includes a network facilitator for receiving the web page from the interface module.

30. The controller as recited in claim 29 wherein the programmable controller is located at a first location and wherein the remote computer is located at a second location.

31. The controller as recited in claim 30 wherein the first location is different from the second location.

32. The controller as recited in claim 29 wherein the functional network is the Internet and wherein the interface module, in generating the instructions, is further operative to generate Hyper-Text Markup Language codes.

33. The controller as recited in claim 32 wherein the network facilitator is a web browser.

34. The controller as recited in claim 23 wherein the data converter module, further converts the data into a comprehensible format.

35. A controller, as set forth in claim 23, wherein the types of data objects may include at least one of the following: error logs, system setting, user program variables, user programs, IO states, and variables that show the current state of operation of the programmable controller.

* * * * *